United States Patent Office 3,051,748

Patented Aug. 28, 1962

3,051,748

ORGANOMETALLIC COMPOUNDS

David O. De Pree and Earl G. De Witt, Baton Rouge, La., assignors to Ethyl Corporation, New York, N.Y., a corporation of Delaware No Drawing. Filed Dec. 2, 1958, Ser. No. 777,589
10 Claims. (Cl. 260—526)

This invention relates to novel organometallic compounds and the production thereof. In particular, the subject invention is concerned with providing metal salts of a 2-carboxy-3-metallo propene.

Therefore an object of this invention is to provide new compositions of matter comprising the metal salts of a 2-carboxy-3-metallo propene. Another object is to provide the aforementioned compositions of matter by novel procedures which render these compositions in high yield and purity. These and other objects shall appear more fully hereinafter.

The above and other objects of this invention are accomplished by reacting the metal salt of a 2-methyl propenoic acid with a metallating agent. In such a manner it is thus possible to produce metal salts of a 2-carboxy-3-metallo propene which constitute the novel compositions of this invention. It is particularly preferred to react the alkali or alkaline earth metal salts of 2-methyl propenoic acid and the exo hydrocarbon derivatives thereof with a metallating agent. By the term "exo" is meant the derivative of 2-methyl propenoic acid wherein one or more of the hydrogen atoms on the 3-carbon atom and the carbon atom of the 2-methyl substituent have been replaced by a hydrocarbon group. The preferred metallating agents of this invention comprise metal amides, metal hydrides and certain metals. When employing such metallating agents in the process of this invention it is especially preferred to utilize alkali or the alkaline earth metals, or the amide and hydride derivatives thereof. Of those metallating agents which can be employed in this invention, metal amides are generally preferred, sodium amide being the most preferred metallating agent. Illustrative of the above processes and a preferred embodiment of this invention, is the reaction between the sodium salt of 2-methyl propenoic acid and sodium amide.

Especially preferred compounds of this invention are the metal salts of 2-carboxy-3-metallo propene and the exo-hydrocarbon derivatives thereof wherein the metallic substituents are alkali or alkaline earth metals. Within this preferred group sodium, potassium and lithium are most preferred. These compounds are highly stable resonance structures which are more stable than corresponding allylic metal compounds and considerably more reactive than the known alpha-metallo metallic alkanoates such as alpha-sodio-sodium acetate Thus the sodium salt of 2-carboxy-3-sodio propene reacts rapidly and smoothly with carbon dioxide at room temperature. Furthermore, this illustrative compound is a yellow solid which does not melt below its decomposition temperature of 290° C. The high thermal stability and the yellow coloring of this compound indicates some form of internal stabilization and is highly indicative of a structure heretofore unknown to sodium compounds. Further support for such a structure is found in the unusual fact that this compound is slightly soluble in tetrahydrofuran and the methyl ether of ethylene glycol. This fact supports a non-ionic structure. The lithium and potassium compounds are very similar to the sodium compounds in properties. Such data suggest that the compounds of this invention exist as unique cyclic configurations wherein the labile electrons are free to resonate within the system.

In general the compounds of the instant invention are solids which are yellow in color. As the molecular weight of these compounds is increased the decomposition temperature is lowered. Thus the sodium salt of 2-carboxy-3-ethyl-3-sodio-propene, the sodium salt of 2-carboxy-3-propyl-3-sodio-propene and other similar higher molecular weight exo-hydrocarbon derivatives of the metallic salts of 2-carboxy-3-metallo propene exhibit decomposition temperatures which are 200° C. or below and generally fall in the range of 150–200° C. Many of the compounds of this invention, and in particular the bridged compounds, exhibit solubility in such solvents as ethers and amines. This solubility is proportional to the molecular weight and as the molecular weight is increased the solubility increases.

In general, the process for preparing the abovementioned novel compounds employs reaction conditions as follows. Temperatures employed are sufficient to initiate reaction and are maintained below the decomposition temperature of the metallo-metallic product produced. Stoichiometric quantities of the reactants are preferably employed. The reactants being substantially anhydrous and preferably of a small particle size. The starting material should be essentially free of organometallics other than the products desired. In one embodiment a premix of the reactants is prepared; the premix is fed continuously to a heated surface blanketed by an inert atmosphere and volatile by-products are continuously removed, the solid product subsequently being recovered from the heated surface. The reaction is conducted at atmospheric or sub-atmospheric pressures.

A particular advantage to the process is that the products are obtained substantially in their pure form in high yield. The purity of the product obtained is important since its separation from other compounds is quite difficult. In particular, the product is obtained free of other organometallic compounds from which it cannot conveniently be separated. If other organometallics were present, as for example amyl sodium, these materials would react competitively with the metallo-metallic organic acid salts of this invention.

Reference to the following working example more fully illustrates a preferred embodiment for the prepara- of the novel compositions of matter of this invention. In this and other working examples which appear hereinafter, all parts and percentages are by weight unless otherwise specified.

*Example I*

Two hundred sixteen (216) parts of sodium methacrylate and 80 parts of sodium amide were weighed in a nitrogen atmosphere and thereafter blended in a twin shell blender using steel balls for grinding. The blended material was slowly center-fed to a Baker Perkins mixer at atmospheric pressure and a temperature of 240° C. over a period of 20 minutes. Heat was maintained for 2 hours and 45 minutes until ammonia evolution had ceased. Thereby 246 parts of product were obtained. The material was a yellow solid which decomposed at 290° C. without melting.

Positive identification of this product was effected as follows: Thirty (30) parts of the product were placed under nitrogen sweep in a reaction vessel provided with a high speed stirrer. Carbon dioxide was then introduced. This gas was rapidly absorbed and the temperature of the reaction mixture increased. The carbon dioxide feed was continued until no further evidence of reaction was observed. The weight of the material after reaction was 38.9 grams or a gain of 8.9 grams corresponding to a 90 percent yield of itaconic acid. The product was hydrolyzed with 200 ml. of water and acidified with HCl. Evaporation was effected with a rotary evaporator under vacuum. The product was then extracted with anhydrous ethanol and this solution evaporated to yield 0.154 mol. of acid corresponding to a 67 percent yield of the sodium salt of 2-carboxy-3-sodio propene.

*Example II*

The process of Example I is repeated with the exception that 48 parts of sodium hydride is utilized in place of the sodium amide reactant. Employing the identification procedures of Example I, it is determined that the product formed is the sodium salt of 2-carboxy-3-sodio propene.

Another embodiment for preparing the novel compositions of the instant invention involves the reaction of a metal salt of a 2-methyl propenoic acid with a metallating agent comprising a metal, preferably an alkali metal, in the presence of a catalyst selected from the group consisting of metal amides and metal hydrides. It is preferred to employ alkali or alkaline earth metal amides or metal hydrides in such instance. By catalytic amounts in this embodiment is meant up to about 5 percent of the weight of the acid salt employed in the reaction system. Although equimolar quantities of the metal acid are preferred, a 20 percent excess of either reactant can be employed. In most cases, however, it is especially preferred to employ the metal salts of the organic acid in about a 5–10 percent excess so that the metal employed can be quantitatively consumed. The following working example is more fully illustrative of this embodiment.

*Example III*

Into a reaction vessel provided with means for charging, heating and stirring and additionally provided with fittings for inlet and outlet of nitrogen, is added 116 parts of the sodium salt of 2-methyl propenoic acid. The nitrogen flush is started and the system heated to about 260° C. for an hour. Thereafter 23 parts of sodium is added in small pieces followed by the addition of catalytic amounts of sodium amide (1.4 parts). The nitrogen is discontinued and the reaction conditions maintained for approximately 1 hour. The system is then shut down and nitrogen flush started. When the reaction mixture is cooled to 170° C., stirring is stopped. The product is cooled to room temperature and withdrawn. The sodium salt of 2-carboxy-3-sodio propene is identified by carboxylation as described in Example I.

As stated hereinabove, the processes of the instant invention generally employ atmospheric or sub-atmospheric pressures. However, in the case of the employment of a catalytic amount of the metal amide or metal hydride, it is sometimes preferred to employ nominal pressure in the range of about 5 p.s.i. through 100 p.s.i. Thus the following working example illustrates the utilization of pressure in the reaction between the sodium salt of 2-methyl propenoic acid and sodium in the presence of catalytic sodium hydride.

*Example IV*

Into a pressure vessel provided with means for heating, continuous addition and stirring are added 108 parts of the sodium salt of 2-methyl propenoic acid, 23 parts of sodium, and 3 parts of sodium hydride. The system is pressurized to 100 p.s.i. with nitrogen and thereupon heated to 260° C. for a period of two hours. Upon completion of the reaction, the product obtained analyzes for the sodium salt of 2-carboxy-3-metallo propene in substantial yields.

As is evident from the above discussion and examples, one of the reactants employed in the process of this invention is a metal salt of a 2-methyl propenoic acid. The following non-limiting formula is exemplary of the types of acid salts employed herein.

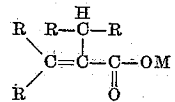

In this formula each R can be hydrogen or hydrocarbon groups which can be the same or different and can be monovalent or polyvalent. Thus the acid salts include structures such as the sodium salt of 1-cyclohexane carboxylic acid. M is a monovalent or polyvalent metallic ion. Exemplary of the hydrocarbon groups which R represents are hydrocarbon groups containing about 1 through 20 carbon atoms. In general, lower hydrocarbon groups are employed, preferably those hydrocarbon groups containing between about 1 through 7 carbon atoms. Alkyl, alkenyl, aryl, cycloalkyl, alkaryl and cycloalkenyl hydrocarbon groups can be employed as the exo-hydrocarbon substituents in the acid salt reactant of this invention. It should be noted that the hydrocarbon substituents described hereinabove are free from substituents reactive with the metal or metal containing reactants and products of this invention. Exemplary of groups which can be substituted on said hydrocarbons are either substituents such as phenoxy phenyl, tertiary amino derivatives, nitroso derivatives, arsino and phosphino derivatives and the like.

The metals which constitute a portion of the acid salt which is employed as a reactant and which are represented in the foregoing exemplary formula as M can be the same or different and are monovalent or polyvalent metallic ions. The alkali and alkaline earth metals, especially sodium, are preferred. In general, any metallic ion can be employed which has a valence of 1 through 4 inclusive. As typical examples of these metals sodium, potassium, rubidium, casium, lithium and the like alkali metals; and calcium, barium, strontium, beryllium, magnesium, radium and the like alkaline earth metals are representative. Other metals can be, for example, aluminum, cadmium, cerium, chromium, copper, iron, lead, nickel, zinc and other metals having a valence of 1 through 4 inclusive which shall be shown more fully hereinafter. It is preferred that the alkali or alkaline earth metals be employed primarily because of their greater availability and reactivity. In this respect sodium has been found to be particularly suitable.

The following list of specific compounds is representative of the types of acid salts which can be employed in the processes of the instant invention. For convenience, the said acid salts are named as the exo-hydrocarbon derivatives of the appropriate metal salt of propenoic acid. For example, the metal salt of 2,3-dimethyl-2-butenoic acid when named as an exo-hydrocarbon derivative of propenoic acid is termed the metal salt of 1,1,2-trimethylpropenoic acid. Thus the sodium, potassium or lithium salts of 2-methyl propenoic acid, the calcium salt of 2-ethyl propenoic acid, the magnesium salt of 2-propyl propenoic acid, the beryllium salt of 2-isopropyl propenoic acid, the aluminum salt of 2-butyl propenoic acid, the sodium salt of 2-sec-butyl propenoic acid, the rubidium salt of 2-pentyl propenoic acid, the cesium salt of 2-heptyl propenoic acid, the potassium salt of 2-eicosyl propenoic acid, the lithium salt of 2-ethenyl propenoic acid, the barium salt of 2-(2-butenyl) propenoic acid, the copper salt of 2-(1,4-pentadienyl) propenoic acid, the lead salt of 2-(3-heptenyl) propenoic acid, the sodium salt of 2-diethenyl methyl propenoic acid, the potassium salt of 2-(bis-cyclopentadienyl methyl) propenoic acid, the beryllium salt of 2-benzyl propenoic acid, the aluminum salt of 2-cyclohexyl methyl propenoic acid, the copper salt of 2-cyclohexenyl methyl propenoic acid, the lead salt of 2-phenoxybenzyl propenoic acid, the sodium salt of 2-cycloheptatrienyl methyl propenoic acid, the sodium salt of 1,1,2-trimethyl propenoic acid, the potassium salt of 1-ethyl-2-methyl propenoic acid, the titanium salt of 1-phenyl-2-methyl propenoic acid, the vanadium salt of 1-propyl-2-methyl propenoic acid, the manganese salt of 1-isopropyl-2-methyl propenoic acid, the iron salt of 1,1-dibutyl-2-methyl propenoic acid, the cobalt salt of 1-sec-butyl-2-methyl propenoic acid, the nickel salt of 1, 1-dipentyl-2-methyl propenoic acid, the zinc salt of 1-heptyl-2-methyl propenoic acid, the tin salt of 1-eicosyl-2-methyl propenoic acid, the antimony salt of 1-benzyl-2-methyl propenoic acid, the strontium salt of 1-cyclo-heptyl-2-methyl propenoic acid, the radium salt of 1-cyclohexenyl-2-methyl propenoic acid, the sodium salt of 1-phenoxy phenyl-2-methyl propenoic acid, the potassium salt of 1-cycloheptadienyl-2-methyl propenoic acid, the lithium salt of 1-(2-butenyl)-2-methyl propenoic acid, and the like can be utilized in this invention.

The other reactants employed in the processes of this invention are metallating agents. These metallating agents in the preferred case are metal amides, metal hydrides, or metals. In addition to metal amides, there can be employed the lower alkyl derivatives of metal amides.

The metals which comprise the metallating agents of this invention are monovalent or polyvalent metals; it is particularly preferred to employ the alkali or alkaline earth metals, especially sodium, although other metals can be employed. In general, any metal can be utilized which has a valence of 1 through 4 inclusive, such as those metals which were described hereinbefore in discussing the acid salt reactant of this invention.

The metal amides or lower alkyl derivatives thereof can be prepared by any method known to the art. For example, metal amide derivatives are readily prepared by reacting amines with the metal in the presence of a conjugated polyene. Sodium propyl amide is prepared by reacting n-propyl amine with finely divided sodium in the presence of butadiene. It is preferred to employ lower alkyl groups which form amine derivatives boiling at about 100° C. or less and being relatively stable under the reaction conditions of this invention. Examples of the amide employed in the instant invention are the methyl, ethyl, isopropyl, propyl, butyl, and the like derivatives of metal amides. These amides can be sodium, potassium, or lithium amides, magnesium amide, calcium amide and the like. In short, the corresponding amides or lower alkyl amide derivatives of monovalent or polyvalent metals, said metals having a valence of 1 through 4 inclusive, can be employed.

Other metallating agents of this invention are metal hydrides. Illustrative of metallic hydrides which can be employed are potassium hydride, aluminum hydride, magnesium hydride, cesium hydride, beryllium hydride, rubidium hydride, copper hydride, calcium hydride, titanium hydride, zirconium hydride and the like.

When the metallating agent comprises a metal, as for example when sodium is employed in the catalytic processes of this invention (see Example III), a wide variety of metals can be employed. Thus in addition to sodium, there can be employed other alkali metals such as lithium, potassium, rubidium and cesium; also alkaline earth metals such as beryllium, magnesium, calcium, barium and so on. In addition to the alkali and alkaline earth metals which are especially preferred appropriate metals having a valence of 1 through 4 inclusive can be utilized in this invention. Examples of these other metals are copper, zinc, aluminum, chromium, tin, lead, and the like. Other metals which can be employed appear hereinafter in discussing the products of this invention.

Having described the reactants employed in the instant invention and having illustrated through working examples the best modes which can be employed in preparing the compositions of the instant invention, the following discussion will deal more fully with the compositions produced thereby.

Reference to the following illustrative formula will more fully clarify the type of compositions encompassed by this invention.

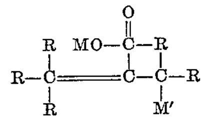

In the above formula each R can be hydrogen or hydrocarbon groups which can be the same or different; M and M′ are metals which can be the same or different comprising mono- or polyvalent metallic ions having a valence of 1 through 4 inclusive. In other words, the R groups and the metals in the instant formula have the same definition as set forth hereinabove in defining the acid salt reactants of the instant invention.

Following is a list of specific compounds which are representative of types of compositions produced by the processes of the instant invention. For convenience the compounds will be named as the exo-hydrocarbon derivatives of 2-carboxy-propene. For example, the sodium salt of 2-carboxy-3-lithio-1-butene, when named as an exo-hydrocarbon derivative of 2-carboxy propene, is called the sodium salt of 2-carboxy-3-methyl-3-lithio-propene. The following compounds are produced by substituting the appropriate acid salt reactant and metallating agent (both described fully hereinbefore) for the reactants in the above working examples. Thus, in Example I, when potassium amide is reacted with the sodium salt of 2-methyl propenoic acid, the sodium salt of 2-carboxy-3-potassio-propene is produced. Similarly, in such a fashion, other alkali and alkaline earth 3-metallo derivatives of this compound can be prepared such as the lithium, rubidium, cesium, francium, beryllium, magnesium, calcium, strontium, barium and radium derivatives of the sodium salt of 2-carboxy propene. Employing the process of Example II, it is possible to prepare a wide variety of other metallic derivatives, as for example, when the appropriate metal hydride is reacted with the sodium salt of 2-propyl propenoic acid. Thus when aluminum hydride, gallium hydride, tellurium hydride, zinc hydride, cadmium hydride, copper hydride, nickel hydride, cobalt hydride, iron hydride, chromium hydride, vanadium hydride, titanium hydride, lanthanum hydride are reacted with the above metal salt the corresponding 3-metallo derivatives of 2-carboxy-3-ethyl propene are produced. Likewise, employing the process of Example I, the calcium salt of 2-carboxy-3,3-dimethyl-3-sodio propene is prepared when sodium amide is reacted with the calcium salt of 2-tertiary-butyl-propenoic acid. Similarly, employing procedures analogous to those taught hereinbefore, it is possible to prepare any of the compounds of this invention such as the following representative listing of compounds: the sodium salt of 2-carboxyl-3-potassio propene, the sodium salt of 2-carboxy-3-methyl-3-lithio propene, the calcium salt of 2-carboxy-3,3-dimethyl-3- sodio propene, the beryllium salt of 2-carboxy-3-ethyl-3-potassio propene, the aluminum salt of 2-carboxy-3-propyl-3-calcio propene, the sodium salt of 2-carboxy-3-methyl-3-ethyl-3-copper propene, the rubidium salt of 2-carboxy-3-butyl-3-manganese propene, the cesium salt of 2-carboxy-3-hexyl-3-sodio propene, the rubidium salt of 2-carboxy-3-heptyl-3-lithio propene, the lithium salt of 2-carboxy-3-ethenyl-3-sodio propene, the sodium salt of 2-carboxy-3-phenyl-3-sodio propene, the francium salt of 2-carboxy-3-(p-benzyl)-3-lithio propene, the tin salt of 2-carboxy-3-decyl-3-sodio propene, the aluminum salt of 2-carboxy-3-(2,4-pentadienyl)-3-zinc propene, the sodium salt of 1-methyl-2-carboxy-3-sodio propene, the lithium salt of 1-propyl-2-carboxy-3-lithio propene, the sodium salt of 1-pentyl-2-carboxy-3-sodio propene, the sodium salt of 1-t-butyl-2-carboxy-3-sodio propene, the titanium salt of 1-heptyl-2-carboxy-3-sodio propene, the tin salt of 1-phenyl-2-carboxy-3-alumino propene, the mercury salt of 1-cyclohexyl-2-carboxy-3-lead propene, the gallium salt of 1-cyclopentadienyl-2-carboxy-3-nickel propene, the manganese salt of 1-eicosyl-2-carboxy-3-chromium propene and the sodium salt of 1-(2-propenyl)-2-carboxy-3-sodio propene.

It is to be noted that in addition to those metals described in the above representative list other metallic ions having a valence of 1 through 4 inclusive can be employed. Thus in any of the above compositions there can be substituted for the specific metals the following: polonium, antimony, bismuth, germanium, tin, lead, aluminum, gallium, indium, zinc, cadmium, mercury, platinum, nickel, osmium, technetium, tungsten, tantalum, molybdenum, chromium, iron, cobalt, rhodium, manganese, vanadium, niobium, titanium, zirconium, scandium, lanthanum and the like.

In addition to the metallating agents described hereinbefore, which are preferred in the process of this invention because of short reaction rates, ease of handling and good yields, it is possible to utilize other metallating agents such as those metallating agents which can be represented by the formula $R_xM$ wherein R is an organic moiety and M is a metal having a valence of 1 through 4 inclusive, such as those metals described hereinbefore. Thus, specific examples of this type of metallating agent are amyl sodium, disodio octadiene, zinc alkyls such as dimethyl zinc, diethyl zinc, and the like. Furthermore, in some instances it is possible to employ as metallating agents in this invention metallic imides such as sodium imide, lithium imide and other metallic imides wherein the metallic substituent has a valence of 1 through 4 such as those metals defined hereinbefore.

In general temperatures are employed which are sufficient to initiate the reaction, but are below the decomposition temperature of the 2-carboxy-3-metallo propene salt produced. Within this range the reaction is preferably conducted at a temperature between about 160° C. and 300° C.

When an amide is employed as the metallating agent in this invention, temperatures from about 40° below the melting point of the lower melting reactant up to the decomposition temperature of the product produced can be employed. When an alkali or alkaline earth metal amide is utilized it is preferred to employ temperatures ranging from about 170° C. to about 290° C. Although the above described temperature ranges, relative to a metal amide, are those ranges which are preferred generally, in some cases, it is preferred to run the process at a temperature ranging from the decomposition temperature of the product produced to about 50° C. less than said decomposition temperature.

When a metal hydride is employed as the reactant in the instant process, it is generally preferred to employ a temperature range from about 160° C. to about 290° C. In most instances when a hydride is employed it is desirable to utilize temperatures approaching the decomposition temperature of the product produced. When an alkali or alkaline earth metal hydride is employed, temperatures ranging from the decomposition temperature of the product produced to about 30° C. less than said decomposition temperatures are especially preferred. For example, when sodium hydride is reacted with the sodium salt of 2-metallo propenoic acid, the temperatures employed are about 260° C. to about 290° C.

In certain instances melting point depressants can be employed, thus permitting conducting the reaction with metal amides at even lower temperatures. For example, when sodium amide is reacted with the sodium salt of 2-methyl propenoic acid an appropriate amount of sodium hydroxide can be mixed with the sodium amide. This decreases the melting point of the latter and thus permits conducting the reaction at a lower temperature. In the case where a melting point depressant is employed temperatures considerably below 160° C. are possible. For example, temperatures between about 100 to 160° C. could be employed. Other melting point depressants which can be used are the halides of the metals. Others will become evident to those skilled in the art.

From the foregoing discussion regarding the use of melting point depressants in the reaction it becomes obvious that when employing a metallic amide or derivative of a metallic amide it is very desirable to conduct the reaction at a temperature so as to render the metallic amide reactant in a fused state. It has been found that conducting the process of this invention with the amide reactant in such a fused state gives better yields and shorter reaction rates than when the reaction is conducted in the non-fused condition. In the case of metal hydrides which have high melting points, generally above the decomposition temperature of the product produced, it is not feasible to run the reaction in such a fused state. Thus, in the case of metallic hydrides the reaction is run in the dry state—that is, a non-fused state. It is for this reason that it is generally desirable to employ higher temperatures when conducting the reaction with a metal hydride reactant, i.e., temperatures between the decomposition temperature of the product produced and 20° less than the said decomposition temperature. For example, when reacting sodium and sodium acetate in the presence of a hydrogen flush best results are obtained at temperatures between about 260° to 280° C.

An excess of either reactant can be employed, however, if an excess of one of the reactants is employed, it is preferable that the metallic salt of the organic acid be in excess so that the metal amide or hydride will be essentially quantitatively consumed. In this manner the product obtained may contain some metal salt of 2-methyl propenoic acid or metallic hydrides thereof, but this impurity has not been found detrimental in subsequent use of the metal salt of the 2-carboxy-3-metallo propene product. In an especially preferred embodiment, essentially stoichiometric quantities of the reactants are employed.

The particle size of the reactants is important. In general, it is preferred to employ particle sizes below about 50 microns. The smaller the particle size, the more intimate contact obtained between the reactants resulting in lower reaction temperatures and shorter reaction periods. When such techniques are employed it is preferred to employ temperatures within about 70° C. of the melting point of the lower melting reactant. As noted previously, the reactants are premixed and fed continuously to a heated surface. Although not required, this is the preferred mode of operation since more efficient comminution of the reactants is obtained. However, when a metallic hydride is employed the reactants are usually contacted in a reaction vessel and heat applied. It should be understood that the reactants need not be pre-ground or pre-mixed, but can be fed to the reactor separately in larger particle sizes and mixed and ground in situ. This is particularly true when the agitation provided in the reactor is of the type to provide grinding of the reaction mixture during the course of the reaction. Employing the technique of the grinding along with the agitation enhances the contact between the reactants, thus providing more complete reaction. One suitable method of obtaining this objective is to employ a ball mill as a reactor. Other apparatus can be employed which will be evident to those skilled in the art.

The reaction should be conducted in an inert atmosphere such as argon, nitrogen, krypton and the like. It is preferable that the inert atmosphere be pre-purified so as to be substantially free of impurities such as oxygen and moisture, since these impurities may be taken up in the product. Although when a metallic hydride is employed the reaction is generally run in the dry state, as described hereinbefore, for some purposes it is desirable to conduct the reaction under an inert liquid blanket. One of the purposes of such an embodiment is to avoid oxygen contamination by impurities in the flushing gas. Another reason is that this inert blanket acts as a solvent for hydrogen or ammonia gas when used to produce the catalyst of this invention in situ. The inert liquid blanket employed is generally a high boiling hydrocarbon oil, such as mineral oil.

The reaction is generally conducted at atmospheric or sub-atmospheric pressures. Sub-atmospheric pressures have the advantage of enhancing removal of the volatile by-product thus obtaining more rapid reaction and more complete shifting of the equilibrium.

The process of this invention is admirably suited to continuous methods. For example, the reactants, separately or together in the proper proportions, are continuously ground to the desired particle size and transmitted to a heated movable reactor surface. The volatile by-product is subsequently removed and recovered for recycling for the preparation of the metal amide or derivative thereof, and the product is continuously discharged from the reactor. This and other modifications will be evident to those skilled in the art.

Although it is generally preferred to employ the metal salt of an organic acid, as described hereinabove, it is obvious that the free acid can also be employed to produce the metal salt in situ. Such an embodiment although utilizing two equivalents of metal for each equivalent of metallated product produced nevertheless only employs one equivalent of metal in the metallation of the 3-carbon position. This embodiment thus is consistent with the stoichiometry described hereinbefore.

When reacting metallic salts of an organic acid with metal hydrides according to this invention, the metallo substituted metallic salts of organic acids as described hereinbefore are obtained essentially free of other organometallic compounds. That is, the products as obtained by our process are not contaminated with more than about 0.5 percent by weight of other organometallic compounds. The process of this invention thus provides these products in essentially pure form thereby permitting their utility in a variety of chemical reactions without the hindrance of competing reactions and the formation of impurities in the final products.

The following working examples more fully illustrate the above described embodiments of this invention.

*Example V*

Into an autoclave provided with means for stirring and preheated to a temperature of 280° C. is charged a mixture of 108 parts of the sodium salt of 2-methyl propenoic acid, 23 parts sodium and 5.4 parts of sodium hydride. Stirring is continued for five minutes whereupon the mass is cooled to room temperature and discharged from the autoclave. The product produced thereby is the sodium salt of 2-carboxy-3-sodio propene.

*Example VI*

Into a reaction vessel is added 200 parts mineral oil. The mineral oil is heated to a temperature of 180° C. whereupon 100 parts of the sodium salt of 2-ethyl propenoic acid and 134 parts of dimethyl sodium amide is added while the reaction mixture is agitated by means of high speed stirring. The stirring and heat are maintained for a period of three hours during which time dimethyl amine is evolved and vented. The reaction is cooled and the solids filtered off. The product obtained thereby is the sodium salt of 2-carboxy-3-methyl-3-sodio propene.

*Example VII*

Into a reaction vessel is added 42.9 parts of sodium amide. The reaction vessel is then heated until the sodium amide melts which occurs in the vicinity of 210° C. Thereafter 108 parts of the sodium salt of 2-methyl propenoic acid is added slowly with stirring. To facilitate venting of the liberated ammonia a slight vacuum is maintained on the system and heating continued for a period of one hour. Thereafter the reaction mass is cooled and the product which is the sodium salt of 2-carboxy-3-sodio propene is recovered in high yields and satisfactory purity.

*Example VIII*

The process of Example VI is repeated with the exception that 180 parts of the lithium salt of 2-benzyl propenoic acid is employed in place of 100 parts of the sodium salt of 2-ethyl propenoic acid and 250 parts of dimethyl ether of diethylene glycol are used in place of mineral oil. Thereby is obtained the lithium salt of 2-carboxy-3-phenyl-3-sodio propene in good yields.

The following working example illustrates the employment of an exo-hydrocarbon derivative of a metallic salt of 2-methyl propenoic acid wherein the exo-hydrocarbon is polyvalent.

*Example IX*

A mixture of 15.3 parts of sodium 1-cyclohexene carboxylate and 3.9 parts sodium amide was slowly fed under nitrogen to a reaction container provided with means for stirring, refluxing, continuous addition and heating and furthermore containing 100 parts of the dimethyl ether of diethylene glycol. The addition was effected at reflux temperature. Ammonia liberation was reached and a yellow product formed, much of which appeared soluble in the ether solvent. The solids were filtered off under nitrogen atmosphere. Analysis disclosed that the product obtained was the sodium salt of 1-carboxy-3-sodio-1-cyclohexene.

The compositions produced in the instant invention find utility in various applications. For example, carboxylation followed by subsequent hydrolysis yields various dicarboxylic acids. The following working example more fully illustrates this particular utility of the compounds of this invention:

*Example X*

Thirty (30) parts of the sodium salt of 2-carboxy-3-sodio propene were placed in a 3-necked reaction container provided with a high speed stirrer. The system was placed under nitrogen sweep. Carbon dioxide was then introduced and this gas was rapidly absorbed, the reaction vessel becoming quite hot. The carbon dioxide feed was continued until no further reaction was evidenced. The product thereby produced was hydrolyzed with 200 parts water and acidified with HCl. Evaporation was effected by means of a rotary evaporator under vacuum. The product was then extracted with anhydrous ethanol and this solution evaporated to yield 0.154 mole of itaconic acid. Similarly, other di-carboxylic acid derivatives of the composition of the instant invention can be produced.

In addition to the above described utility for the compounds of this invention these compounds find utility in a multitude of other applications. For example, the metallo-metallic salts described herein upon alkylation yield longer chain acid salts, as for example, when the sodium salt of 2-carboxy-3-sodio propene is reacted with a compound which can be represented by the formula RX. In this formula R is an organic group and X can be halogen, sulfate and other functional groups reactive with the metallo salt. In addition to reactions with compounds of the RX type, the metallo-metallic salts of this invention can also be reacted with olefins to produce the appropriate derivatives of long chain acid salts. Also when an excess of the RX type compound described above is employed in a reaction with the metallo-metallic salts of this invention, esters of longer chain acids are produced.

When the metallo-metallic salts of this invention are reacted with compounds represented by the general formula $RX_2$ wherein R is an organic group containing substituents which are unreactive with the metallo-metallic salts described herein and X is a functional group which is reactive with the 3-metallo substituent of the compounds of this invention such as hydrogen and sulfate groups, it is possible to produce polyester derivatives of the various metallo-metallic salts described herein.

Furthermore, the compositions of this invention can, through oxidation, be coverted to various compounds, as for example when the sodium salt of 2-carboxy-3-sodio propene is reacted with sulfur to produce the sodium mercaptide.

Upon sulfination the compounds described herein can be converted to various sulfinate derivatives of the appropriate metallo-metallic acid salt. Furthermore, epoxidation converts the metallo-metallic salts of this invention to the appropriate hydroxy metallo-alkanates.

Various organometallic compounds can be produced via transmetallation reactions with the compositions of this invention. Exemplary of this type of reaction is the reaction between the sodium salt of 2-carboxy-3-sodio propene and a trialkyl tin halide to produce the corresponding sodium salt of 2-carboxy-3-(trialkyl tin) propene.

Further utility for these products such as reaction with ketones and esters will become apparent to those skilled in the art.

Having thus described the products of this invention and the best modes for the preparation thereof it is not intended that this invention be limited in any manner except as set forth in the following claims.

We claim:

1. A process for the preparation of a metal salt of 2-carboxy-3-metallo propene which comprises reacting a metal salt of 2-methyl propenoic acid with a metalating agent selected from the group consisting of alkali metal amides, alkaline earth metal amides, alkali metal hydrides, alkaline earth metal hydrides, alkali metals and alkaline earth metals, the metal constituent of said last named metal salt having a valence of 1 through 4, inclusive; said process being conducted in an inert atmosphere and at a temperature of about 160° C. up to the decomposition temperature of the 2-carboxy-3-metallo propene salt produced.

2. A process for the preparation of a metal salt of the exo-hydrocarbon derivatives of 2-carboxy-3-metallo propene which comprises reacting a metal salt of the exo-hydrocarbon derivatives of 2-methyl propenoic acid with a metalating agent selected from the group consisting of alkali metal amides, alkaline earth metal amides, alkali metal hydrides, alkaline earth metal hydrides, alkali metals and alkaline earth metals, the metal constituent of said last named metal salt having a valence of 1 through 4, inclusive; said process being conducted in an inert atmosphere at a temperature of about 160° C. up to the decomposition temperature of the exo-hydrocarbon derivative of the 2-carboxy-3-metallo propene salt produced.

3. A process for the preparation of a metal salt of 2-carboxy-3-metallo propene comprising reacting, at a temperature of about 160° to about 300° C., a metal salt of 2-methyl propenoic acid with a metalating agent selected from the group consisting of alkali metal amides, alkaline earth metal amides, alkali metal hydrides, alkaline earth metal hydrides, alkali metals and alkaline earth metals, said process being carried out at a pressure not substantially greater than atmospheric and in an inert atmosphere, the metal constituent of said last named metal salt having a valence of 1 through 4, inclusive.

4. The process for the preparation of 2-carboxy-3-metallo propene which comprises reacting sodium with the sodium salt of 2-methyl propenoic acid, said sodium and said sodium salt having a particle size less than about 50 microns, said process being conducted at a temperature between about 160° and 300° C., and in an inert atmosphere.

5. A process for the preparation of 2-carboxy-3 metallo propene which comprisees reacting sodium with the sodium salt of 2-methyl propenoic acid while mixing and grinding the reactants in solid form, said process being conducted at a temperature between 160° and 300° C., and in an inert atmosphere.

6. As a composition of matter the metal salts of an exo-hydrocarbon derivative of 2-carboxy-3-metallo propene, wherein said metal and said metallo constitutents have a valence of 1 through 4 inclusive.

7. The metal salt of 2-carboxy-3-metallo propene wherein said metal and said metallo substituents are selected from the group consisting of alkali metals, alkaline earth metals, aluminum, cadmium, cerium, chromium, copper, iron, lead, nickel and zinc.

8. The metal salt of 2-carboxy-3-metallo propene wherein said metal and said metallo sbstituents are alkali metals.

9. The metal salt of 2-carboxy-3-metallo propene wherein said metal and said metallo substituents are alkaline earth metals.

10. The sodium salt of 2-carboxy-3-sodio propene.

No references cited.